(12) United States Patent
Kim et al.

(10) Patent No.: US 11,150,688 B2
(45) Date of Patent: Oct. 19, 2021

(54) DISPLAY DEVICE

(71) Applicant: LG Display Co., Ltd., Seoul (KR)

(72) Inventors: Tae-Hyung Kim, Gimpo-si (KR); Geun-Chang Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/194,789

(22) Filed: Nov. 19, 2018

(65) Prior Publication Data
US 2019/0163234 A1  May 30, 2019

(30) Foreign Application Priority Data
Nov. 28, 2017 (KR) .................. 10-2017-0160529

(51) Int. Cl.
| G06F 1/16 | (2006.01) |
| H04R 17/00 | (2006.01) |
| H04R 7/04 | (2006.01) |
| H04R 5/02 | (2006.01) |
| H04R 1/02 | (2006.01) |

(52) U.S. Cl.
CPC ........... *G06F 1/1605* (2013.01); *H04R 17/00* (2013.01); *H04R 1/028* (2013.01); *H04R 5/02* (2013.01); *H04R 7/045* (2013.01); *H04R 2440/05* (2013.01); *H04R 2499/15* (2013.01)

(58) Field of Classification Search
CPC .... H04R 17/00; H04R 17/005; H04R 17/025; H04R 2499/15; H01L 41/00
See application file for complete search history.

(56) References Cited

U.S. PATENT DOCUMENTS

| 6,278,790 B1* | 8/2001 | Davis ........................ H04R 7/04 |
| | | 310/324 |
| 6,959,096 B2* | 10/2005 | Boone ....................... H04S 3/00 |
| | | 381/152 |
| 8,077,159 B2* | 12/2011 | St. Pierre ................ G06F 3/043 |
| | | 178/18.01 |
| 8,106,888 B2* | 1/2012 | Hill .......................... G06F 3/043 |
| | | 345/173 |
| 8,466,778 B2* | 6/2013 | Hwang ................. B06B 1/0207 |
| | | 340/407.1 |
| 2001/0011993 A1* | 8/2001 | Saarinen .................. H04R 5/04 |
| | | 345/156 |
| 2003/0112298 A1* | 6/2003 | Sato ........................ H01L 27/20 |
| | | 347/68 |
| 2004/0131202 A1* | 7/2004 | Cranfill ................ H04M 1/035 |
| | | 381/89 |
| 2004/0233174 A1* | 11/2004 | Robrecht .............. G06F 3/0433 |
| | | 345/173 |
| 2006/0256985 A1* | 11/2006 | Vincent ................ G03B 21/565 |
| | | 381/306 |
| 2007/0110265 A1* | 5/2007 | Kirkeby ................. G06F 1/1626 |
| | | 381/300 |
| 2010/0067726 A1* | 3/2010 | Suzuki .................. G06F 1/1605 |
| | | 381/333 |
| 2011/0242014 A1* | 10/2011 | Tsai ..................... G06F 3/0414 |
| | | 345/173 |

(Continued)

*Primary Examiner* — Fan S Tsang
*Assistant Examiner* — Angelica M McKinney
(74) *Attorney, Agent, or Firm* — Morgan, Lewis & Bockius LLP

(57) ABSTRACT

The present invention relates to a display device including a speaker using piezoelectric elements having an amplification effect in a low frequency range.

16 Claims, 20 Drawing Sheets

(56) References Cited

U.S. PATENT DOCUMENTS

| | | | |
|---|---|---|---|
| 2015/0018046 A1* | 1/2015 | Nabata | H04M 1/026 |
| | | | 455/566 |
| 2015/0043758 A1* | 2/2015 | Yamada | H04R 1/46 |
| | | | 381/151 |
| 2015/0117686 A1* | 4/2015 | Kim | H04R 1/028 |
| | | | 381/306 |
| 2015/0338982 A1* | 11/2015 | Dufva | G06F 3/023 |
| | | | 345/168 |
| 2015/0341714 A1* | 11/2015 | Ahn | G06F 1/1688 |
| | | | 381/333 |
| 2017/0153703 A1* | 6/2017 | Yun | G06F 3/041 |
| 2018/0082673 A1* | 3/2018 | Tzanetos | G10K 11/17857 |
| 2018/0249248 A1* | 8/2018 | Harris | H04R 29/002 |
| 2018/0317011 A1* | 11/2018 | Choi | H04R 9/025 |
| 2018/0352314 A1* | 12/2018 | Lee | H04R 1/288 |
| 2019/0079556 A1* | 3/2019 | Choi | H04R 7/045 |
| 2019/0245133 A1* | 8/2019 | Umeda | H01L 41/0478 |

* cited by examiner

DISPLAY DEVICE

This application claims the benefit of Korean Patent Application No. 10-2017-0160529, filed on Nov. 28, 2017, which is hereby incorporated by reference as if fully set forth herein.

BACKGROUND

Technical Field

The present disclosure relates to a display device, and more particularly, to a display device including a piezoelectric element capable of reproducing sound by securing a sufficient sound pressure even in a low frequency range.

Discussion of the Related Art

Recently, display devices such as a large-screen TV as well as display devices such as a cellular phone, a smartphone and a laptop computer have gradually become thinner to be realized as a thin flat panel display device or to be slim enough to have a constant curvature like a flexible display device, a curved display device, or a bendable display device. Accordingly, a speaker for reproducing sound in the display device must also have a slim size suitable to be disposed in the device.

Speakers are classified into a magnetic speaker using a magnet coil and a piezoelectric speaker for receiving an electric signal and reproducing the same through vibration, according to a method used therefor.

A typical magnetic speaker vibrates a coil disposed between the magnetic poles of a permanent magnet by causing a current to flow through the coil, and the thickness of the poles and the coil of the magnet is greater than the that of the display panel and a housing member for accommodating the same. Further, heat is generated in the display panel when vibration is generated due to severe heat generated by driving of the coil.

For this reason, piezoelectric speakers using piezoelectric elements that are thin, light, and low in power consumption compared to magnetic speakers have recently been preferred in display devices.

However, in spite of the aforementioned advantages, it is pointed out that it is difficult for a piezoelectric speaker to obtain a sufficient sound pressure output in a low frequency range of 1 kHz or less.

SUMMARY

Accordingly, embodiments of the present disclosure are directed to a display device that substantially obviates one or more of the problems due to limitations and disadvantages of the related art.

An aspect of the present disclosure is to provide a display device including a speaker using a piezoelectric element having an amplification effect in a low frequency range that substantially obviates one or more problems due to limitations and disadvantages of the related art.

An aspect of the present disclosure is to provide a display device including a piezoelectric element capable of reproducing sound by securing a sufficient sound pressure even in a low frequency range.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

The present disclosure relates to a display device including a speaker using piezoelectric elements having an amplification effect in a low frequency range.

To achieve these and other aspects of the inventive concepts, as embodied and broadly described, a display device comprises a display panel, a bottom cover having a bottom surface spaced a predetermined distance from a rear surface of the display panel, the bottom cover being configured to accommodate the display panel, and a first pair of piezoelectric elements attached to the rear surface of the display panel, the first pair of piezoelectric elements including a first piezoelectric element and a second piezoelectric element arranged in parallel and spaced apart from each other by a first distance to reinforce at least a first frequency range between 130 Hz and 350 Hz.

Here, the first distance may be 9 to 15 times a thickness of the display panel.

The first and second piezoelectric elements may each have a planar shape of a polygon or an ellipse elongated in a direction intersecting the first distance between the first and second piezoelectric elements.

The first distance may be 63 mm to 115 mm.

In addition, the first frequency range may have a continuous span of at least 20 Hz between 130 Hz and 350 Hz.

In addition, the first pair of piezoelectric elements may include a plurality of piezoelectric elements arranged at different positions.

The display device may further include a second pair of piezoelectric elements arranged in a direction intersecting an arrangement of the first and second piezoelectric elements, the second pair of piezoelectric elements including a third piezoelectric element and a fourth piezoelectric element spaced apart from each other by a second distance to reinforce a second frequency range different from the first frequency range.

Here, the first frequency range and the second frequency range may be adjacent to each other.

In this case, the second distance may be 75 mm to 105 mm.

In addition, the display panel may have two or more peak points of sound pressure within the first frequency range and the second frequency range.

In addition, each of the first to fourth piezoelectric elements may include a first surface, a second surface, and a piezoelectric layer arranged between the first surface and the second surface, the first surface and the second surface having a shape of a flat plate, facing in opposite directions and having different polarities.

The display device may further include a first double-sided tape surface-attached to the first surface and the rear surface of the display panel.

The display device may further include a metal plate arranged between the first surface and the first double-sided tape.

The display device may further include a buffer member arranged between the second surface and the bottom surface of the bottom cover.

A difference in peak-to-peak sound pressure level between a peak point of the first frequency range and a peak point of the second frequency range may be less than or equal to 10 dB, the first frequency range and the second frequency range being adjacent to each other.

In addition, the second pair of piezoelectric elements may include a plurality of piezoelectric elements arranged at different positions.

In some cases, when both the first and second pairs of piezoelectric elements are provided, the first pair of piezoelectric elements and the second pair of piezoelectric elements may selectively or all include a plurality of pairs. Arrangement of the plurality of pairs of the first pair and the second pair may be selected in consideration of an amplification region and a stereo effect in a required low frequency range.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure. In the drawings.

DETAILED DESCRIPTION OF THE INVENTION

Figure 1:
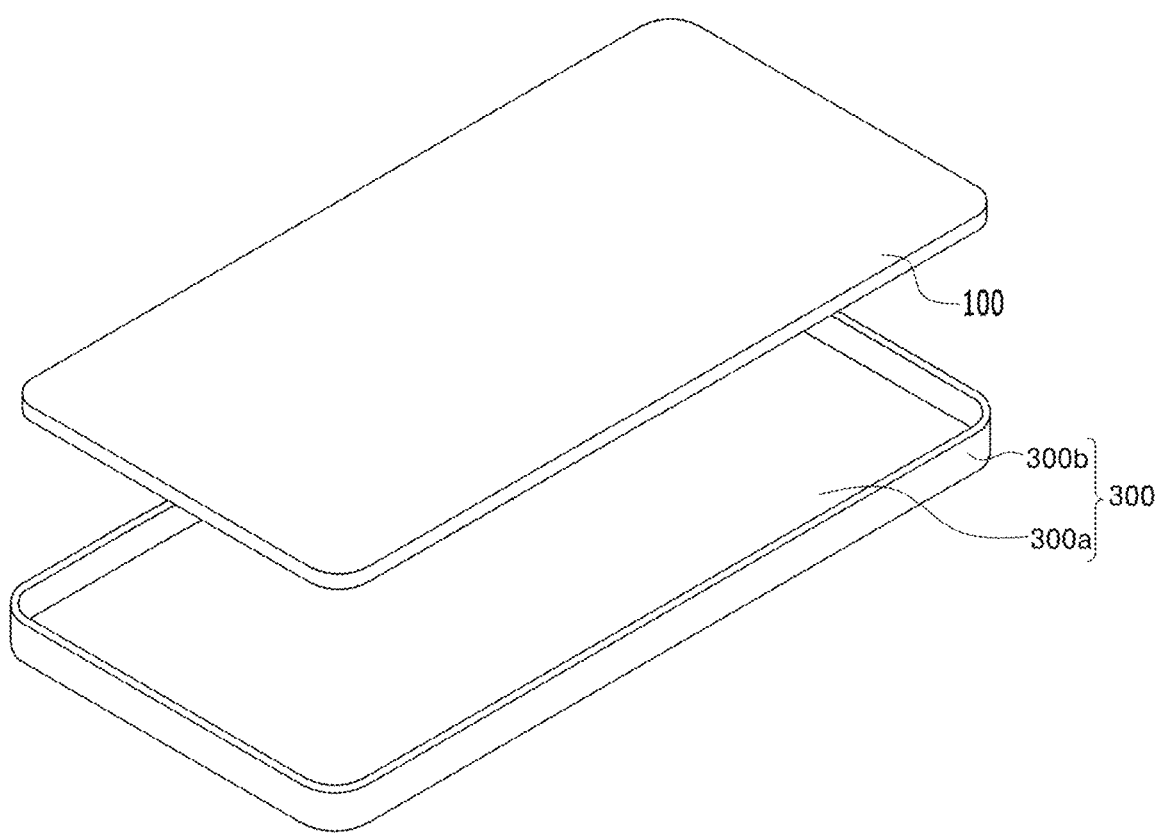
FIG. 1 is a perspective view showing a display device according to an example embodiment of the present disclosure.

The advantages and features of the present invention and the manner of achieving the same will become apparent from the embodiments described in detail below with reference to the accompanying drawings. The present invention may, however, be embodied in many different forms and should not be construed as limited to the embodiments set forth herein. It should be understood that these embodiments are provided such that the disclosure will be thorough and complete, and will fully convey the concept of the invention to those skilled in the art. The scope of the invention is only defined by the claims. Wherever possible, the same reference numerals will be used to refer to the same or like parts.

The shapes, sizes, ratios, angles, numbers and the like disclosed in the drawings to describe embodiments of the present invention are merely exemplary and the present invention is not limited thereto. Like reference numerals refer to like elements throughout the specification. In the following description of the present invention, a detailed description of known related art will be omitted when it is determined that the subject matter of the present invention may be unnecessarily obscured.

As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements are to be interpreted as including margins of error even without explicit statements.

In describing positional relationships, when phrases such as "an element A on an element B," "an element A above an element B," "an element A below an element B" and "an element A next to an element B," are used, another element C may be disposed between the elements A and B unless the term "immediately" or "directly" is explicitly used.

In describing temporal relationships, terms such as "after," "subsequent to," "next to," "before," and the like may include cases where any two events are not consecutive, unless the term "immediately" or "directly" is explicitly used.

In describing elements, terms such as "first" and "second" are used, but the elements are not limited by these terms. These terms are simply used to distinguish one element from another. Accordingly, as used herein, a first element may be a second element within the technical idea of the present invention.

It should be understood that the term "at least one" includes all possible combinations of one or more related items. For example, "at least one of a first item, a second item and a third item" means not only each of the first item, the second item or the third item but also all possible combinations of two or more of the first item, the second item and the third item.

Features of various exemplary embodiments of the present invention may be partially or fully combined. As will be clearly appreciated by those skilled in the art, various interactions and operations are technically possible. Various exemplary embodiments can be practiced individually or in combination.

Figure 2:
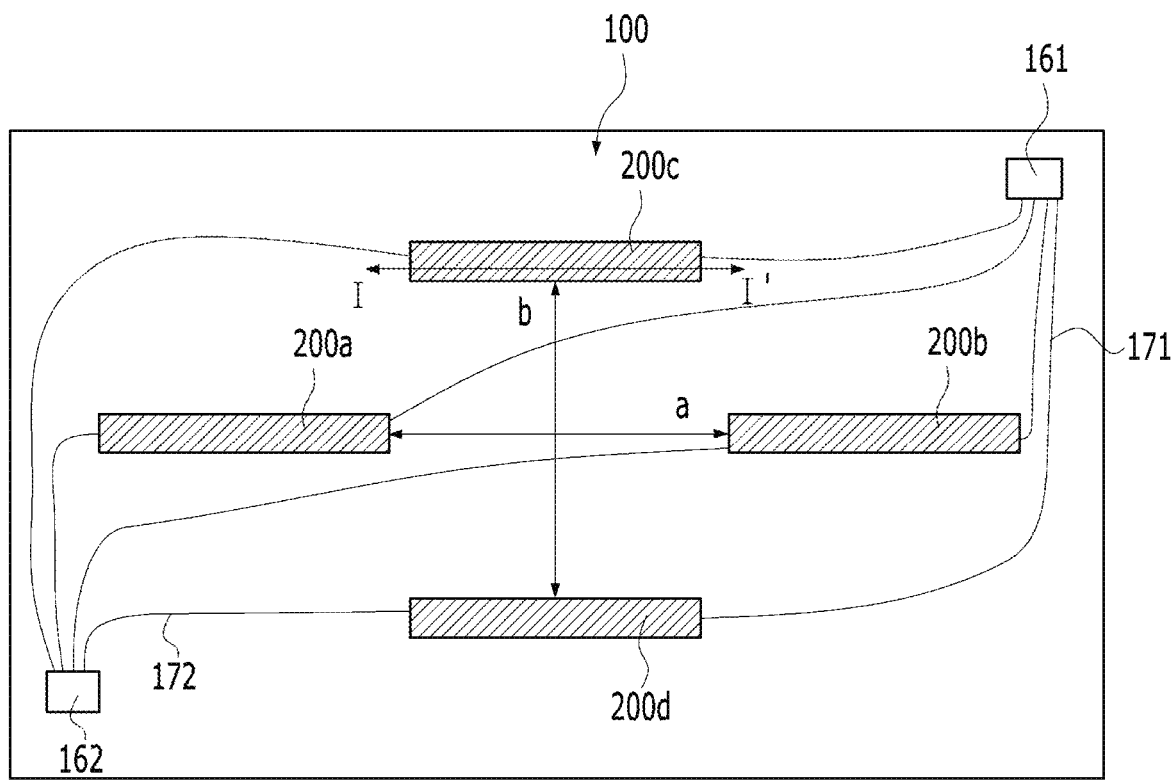
FIG. 2 is a plan view showing the rear surface of the display panel of FIG. 1.
Figure 3A:
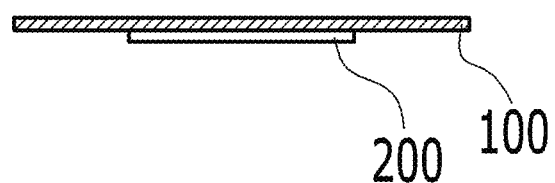
FIG. 3A is a cross-sectional view taken along line I-I' of FIG. 2.
Figure 3B:
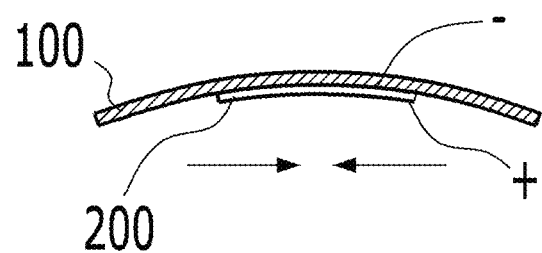
FIGS. 3B and 3C are cross-sectional views showing a bending motion according to vibration of the piezoelectric element of FIG. 3A.
Figure 3C:
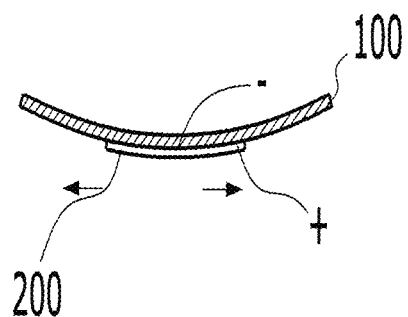

FIG. 1 is a perspective view showing a display device according to an example embodiment of the present disclosure, and FIG. 2 is a plan view showing the rear surface of the display panel of FIG. 1. FIG. 3A is a cross-sectional view taken along line I-I' of FIG. 2. FIGS. 3B and 3C are cross-sectional views showing a bending motion according to vibration of the piezoelectric element of FIG. 3A.

As shown in FIG. 1, the display device of the present invention includes a display panel 100 and a bottom cover 300 provided with a bottom surface 330a spaced apart from the rear surface of the display panel 100 by a certain distance so as to accommodate the display panel.

As shown in FIG. 1, the bottom cover 300 may have a lateral surface 300b around the bottom surface 300a, but the lateral surface 300b may be omitted if necessary. If the lateral surface 300b is omitted, the bottom cover 300 may take the form of a plate.

The display panel 100 of the present invention reproduces an image, and the sound is reproduced through piezoelectric elements 200 as shown in FIG. 2. In the cross-sectional views of FIGS. 3A to 3C, the piezoelectric elements are denoted by 200. This is because the piezoelectric elements have the same cross-sectional structure even if they are disposed at different positions in the plane of FIG. 2.

In the display device of the present invention, the piezoelectric element 200 implemented as a speaker is attached to the rear surface of the display panel 100 and operates integrally with the display panel 100. That is, the vibration generated when an electrical signal is applied to the piezoelectric element 200 causes the same bending effect in the display panel 100 and the piezoelectric element 200, as shown in FIGS. 3B and 3C.

In the display device of the present invention, as shown in FIG. 2, the piezoelectric element 200 is a paired structure of one or more pairs of piezoelectric elements arranged parallel to each other like a first pair of first and second piezoelectric elements 200a and 200b, which are parallel to each other and are spaced apart from each other by a first distance so as to reinforce at least a first frequency range between 130 Hz and 350 Hz. Other arrangement structures of piezoelectric elements will be described later in various embodiments of the present disclosure. The essential structure of the piezoelectric elements of the present invention is at least one pair of piezoelectric elements disposed parallel to each other and symmetrically arranged.

As shown in FIG. 2, the piezoelectric element 200 may further include a second pair of a third piezoelectric element 200c and a fourth piezoelectric element 200d, which are spaced apart from each other by a second distance b intersecting the first distance a. The first pair of first and second piezoelectric elements spaced apart by the first distance a and the second pair of third and fourth piezoelectric elements spaced apart by the second distance b are arranged to intersect each other with a tendency of vibration transmission in the longitudinal direction. Accordingly, the influence or interference of the pairs of piezoelectric elements on or with the counterpart pair of piezoelectric elements is low, and thus the function of each pair of piezoelectric elements to reinforce a specific frequency is not deteriorated.

In the display device according to the present invention shown in FIG. 2, the speaker is located on the back side of the display panel 100, and the piezoelectric elements 200a, 200b, 200c, 200d in at least one pair are arranged parallel to each other in each pair (200a, 200b/200c, 200d). However, it is to be noted that although two pairs of piezoelectric elements are shown in FIG. 2 and other figures of the present disclosure, the arrangement of two pairs of piezoelectric elements in the display device is just exemplary examples, and the present disclosure is not limited thereto. For example, only one pair of piezoelectric elements may be arranged in the display device to obtain a sufficient sound pressure output in a low frequency range of 1 kHz or less. For another example, three or more pairs of piezoelectric elements may be arranged in the display device to obtain a sufficient sound pressure output.

As shown in FIG. 3A, each of the piezoelectric elements 200a, 200b, 200c, and 200d is disposed on the rear surface of the display panel 100, respectively, and a first surface thereof facing the rear surface of the display panel 100 is fully attached to the rear surface of the display panel 100 without a gap. As shown in FIG. 3B, when a voltage is applied to the piezoelectric elements 200a, 200b, 200c, and 200d, bending produced in response to vibration of the piezoelectric elements 200a, 200b, 200c, and 200d is directly transmitted to the display panel 100.

One side of each of the piezoelectric elements 200a, 200b, 200c, and 200d is connected, via a first wire 171, to a first FPC 161, which applies a voltage of a first polarity, and the other side thereof is connected, via a second wire 172, to a second FPC 162, which applies a voltage of a second polarity which is opposite to the first polarity.

In the cross-sectional views of FIGS. 3A to 3C and FIGS. 6A to 6D, the piezoelectric elements are denoted by 200. This is because the piezoelectric elements have the same cross-sectional structure even if they are disposed at different positions in the plane.

The display panel 100 refers to a panel that receives an electrical signal and displays an image, such as a liquid crystal panel, an organic light emitting display panel, or an electrophoretic panel. The display panel 100 has a thickness of 1 mm or less, and vibration of the piezoelectric elements 200a, 200b, 200c, and 200d is directly transmitted thereto. Thereby, the surface of the display panel 100 exhibits bending movement according to each frequency.

For example, the display panel 100 may include, on a substrate, a thin film transistor array, an organic light emitting array connected thereto, and a sealing layer for sealing the thin film transistor array and the organic light emitting array. In some cases, the display panel 100 may further include a polarizing plate or an optical film such as an optical compensation film on the sealing layer.

Each of the piezoelectric elements 200a, 200b, 200c, and 200d has electrodes on the surface thereof. Each of the piezoelectric elements 200a, 200b, 200c, and 200d may have first and second surfaces opposed to each other and having different polarities, and a piezoelectric layer may be interposed between the first and second surfaces. In some cases, the first and second electrodes may be alternately arranged between the piezoelectric layers, and thus each of the first and second electrodes may have a comb structure. For example, when the first surface of each of the piezoelectric elements 200a, 200b, 200c, and 200d has the first electrode to which a (+) voltage is applied, the second surface may have the second electrode to which a (−) voltage is applied, and vice versa. FIGS. 3B and 3C show the opposite case.

In the display device of the present invention, the speaker is characterized in that the piezoelectric elements of the first and second pairs are arranged at specific spacing distances a and b from each other. These spacing distances a and b are intended to cause amplification in a predetermined frequency range, in particular, to cause amplification in a low frequency range of 130 Hz to 350 Hz. Since frequency amplification is allowed in different frequency ranges through the pairs of piezoelectric elements arranged at the different distances a and b, uniform amplification may be obtained in the low frequency band.

Each of the piezoelectric elements 200a, 200b, 200c, and 200d shown in FIG. 2 is arranged in a rectangular shape that is long in the horizontal direction in the plane. However, the planar shape of the piezoelectric elements 200a, 200b, 200c, and 200d is not limited thereto, and may be an ellipse elongated in one direction, a circle, or a polygon. What is meaningful about the display device of the present invention in relation to amplification of the sound pressure level in the low frequency range is not the shape of each of the piezoelectric elements, but is that the piezoelectric elements from each pair have the same shape and are arranged in parallel at a specific spacing distance from each other to allow amplification at a predetermined frequency in the low frequency range.

Figure 4:
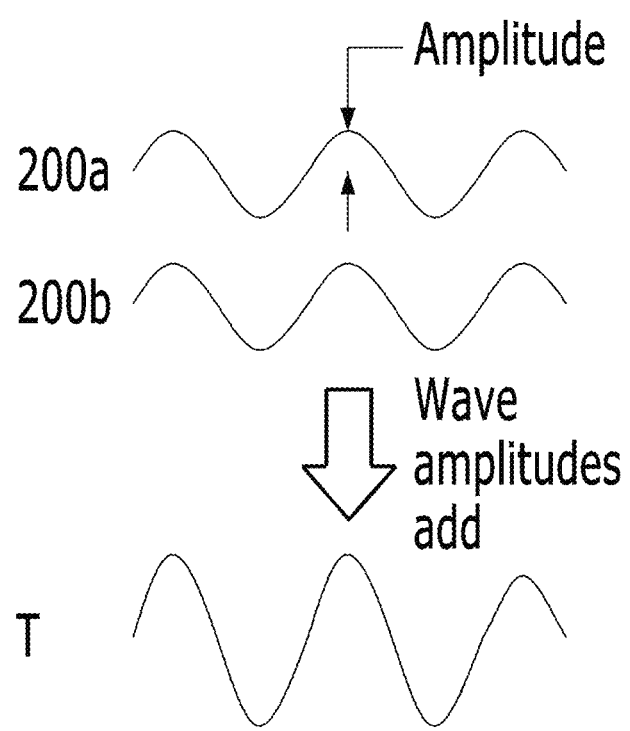
FIG. 4 is a waveform diagram showing an amplification effect occurring in the piezoelectric elements of FIG. 2 symmetrically arranged in parallel.
Figure 5A:
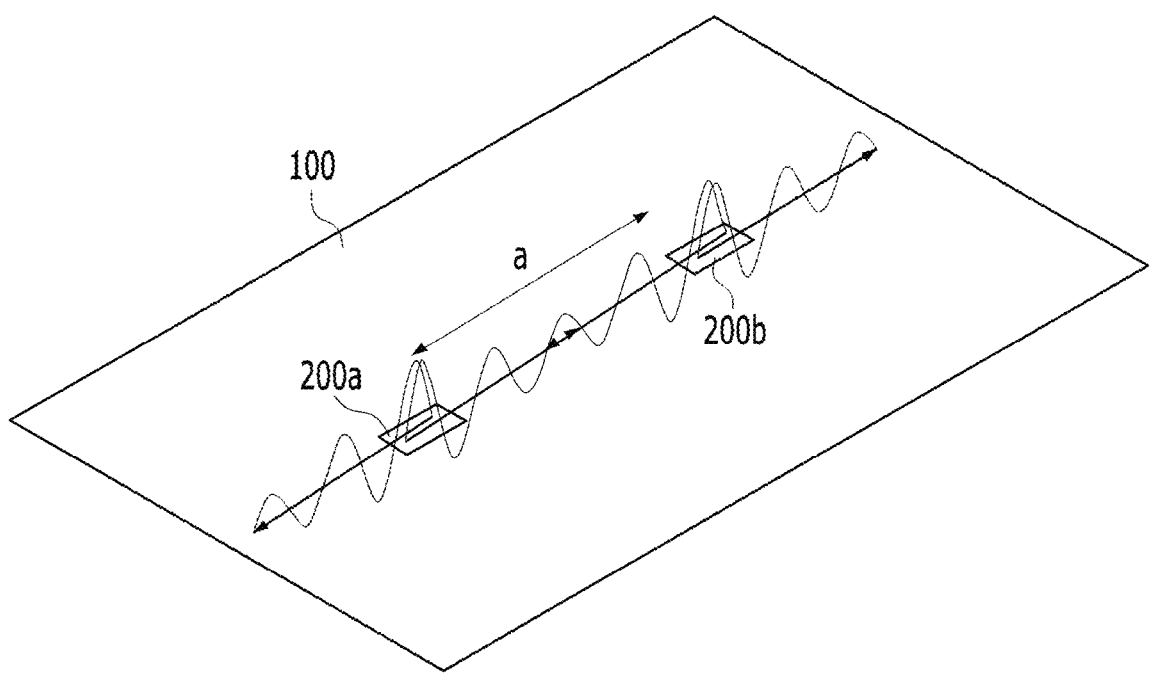
FIGS. 5A and 5B are diagrams showing waveforms generated in a first pair of piezoelectric elements and a second pair of piezoelectric elements shown in FIG. 2, respectively.
Figure 5B:
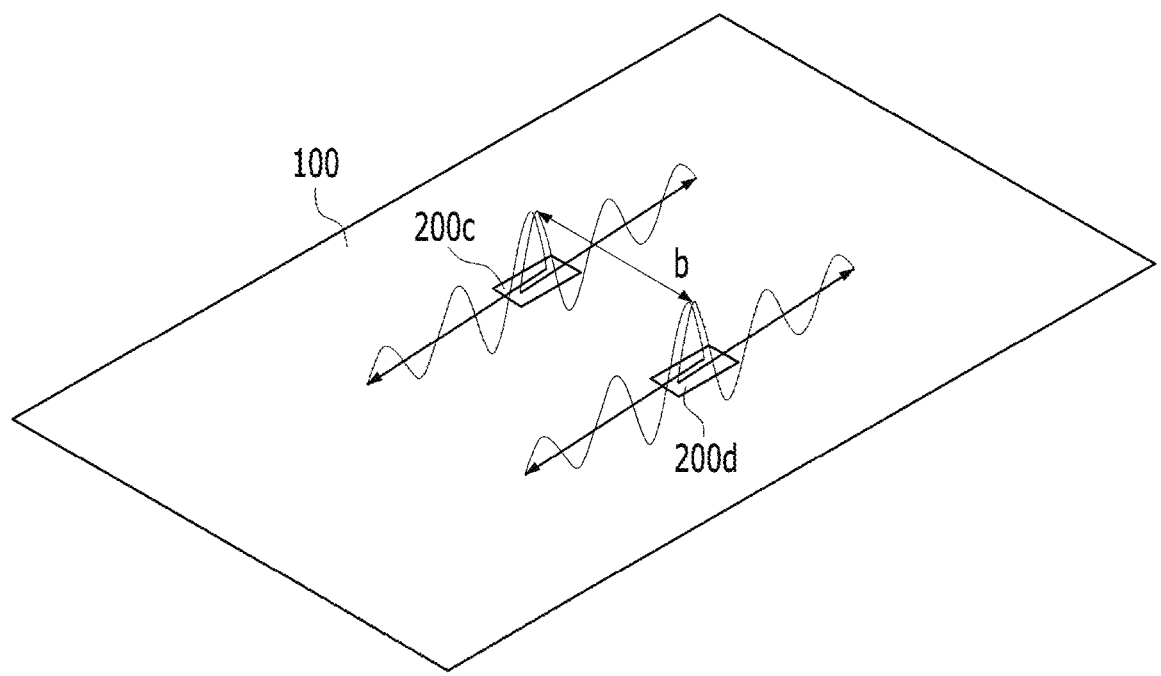

FIG. 4 is a waveform diagram showing an amplification effect occurring in the piezoelectric elements of FIG. 2 arranged symmetrically, and FIGS. 5A and 5B are diagrams showing waveforms generated in the first pair of piezoelectric elements and the second pair of piezoelectric elements shown in FIG. 2, respectively.

As shown in FIGS. 4 and 5A, the first and second piezoelectric elements 200a and 200b, which are spaced apart from each other by the first distance a, have wavelengths which resonate at the same frequency or at similar frequencies. Therefore, the vibration finally transferred to the display panel 100 is the sum of the waveforms of the first and second piezoelectric elements 200a and 200b, which corresponds to about twice the intensity of the waveform produced in one piezoelectric element, and thus an effect of raising the sound pressure is obtained.

Such amplification of waveforms may also be caused by the third and fourth piezoelectric elements 200c and 200d, which are spaced apart from each other by the second distance b different from the first distance a. In this case, as shown in FIGS. 5A and 5B, the frequency range in which the amplification effect obtained by the third and fourth piezoelectric elements 200c and 200d spaced apart from each other by the second distance b is exhibited may be different from the frequency range in which the amplification effect obtained by the first and second piezoelectric elements 200a and 200b is exhibited. That is, the amplification effect obtained by the first pair of the first and second piezoelectric elements 200a and 200b is continuously produced in a range spanning by approximately 20 Hz to 50 Hz in the low frequency range of about 130 Hz to 350 Hz. In a range which is not continuous, the amplification effect is weak or not exhibited. That is, for example, when the amplification effect obtained by the parallel arrangement of the first pair of piezoelectric elements 200a and 200b is exhibited in the first frequency range, it is difficult to find an equivalent amplification effect in frequency ranges outside the first frequency range. However, in a frequency range above 350 Hz, a sufficient sound pressure of 80 dB or more can be obtained even with a single piezoelectric element, and therefore the amplification effect by the parallel arrangement of a pair of piezoelectric elements is not particularly required. In the display device of the present invention, a sufficient sound pressure level may be obtained at a frequency of 350 Hz or more even by arrangement of a single piezoelectric element. Therefore, the present invention is focused on raising a sound pressure level in a specific frequency range through specific arrangement of piezoelectric elements for the low frequency range in which a sufficient sound pressure level cannot be obtained with a single piezoelectric element alone.

As shown in FIG. 5B, the second pair of piezoelectric elements 200c and 200d may have an amplification effect in the second frequency range different from the first frequency range as the second distance b, which is the spacing distance between the piezoelectric elements of the second pair, differs from the first distance a. As a result, the effect of uniformly increasing the sound pressure in the low frequency range may be obtained, and the low frequencies may be heard evenly.

Here, when the first and second frequency ranges are adjacent to each other, the amplification effects in the first and second frequency ranges may complement each other. In this way, when the first and second frequency ranges to be reinforced are adjacent to each other, the sound pressure may increase in the continuous low frequency range, and the audible frequency range may be widened. If there is a gap between the reinforced frequency ranges, a discontinuous listening characteristic will appear in a specific low frequency range, and thus the reinforced widened frequency range below a specific frequency will be substantially treated as a poor hearing range.

Here, the amplification effect may be obtained in the low frequency range when the first distance "a" or the second distance "b" is 9 to 15 times the thickness of the display panel 100. If the first and second distances a and b are less than nine times the thickness of the display panel 100, transmission of sound may be low when the amplitude of vibration transmitted through the display panel 100 is less than the thickness of the display panel 100 in the transmission direction of the vibration. If the first and second distances "a" and "b" exceed 15 times the thickness of the display panel 100, vibrations occurring in the pair of piezoelectric elements may not cause constructive interference with each other, and thus the amplification effect in a specific low frequency range may be deteriorated.

For example, the first distance a may be 63 mm to 115 mm. In this range, a sufficient sound pressure level of 80 dB or more may be obtained, and thus the sound produced in front of the display panel 100 by transmitted vibration may be actually heard.

The possible range of the second distance "b" may be narrower than the range of the first distance "a" by about 10 mm at the upper limit and the lower limit, respectively. Even in this case, a sufficient sound pressure level of 80 dB or more may be obtained. In this case, since the spacing distance of the first pair of piezoelectric elements 200a and 200b is different from that of the second pair of piezoelectric elements 200c and 200d, the sound pressure levels of two or more peaks may be obtained by the arrangement of these two pairs of piezoelectric elements in the low frequency range.

The illustrated example is intended to describe that the waveform has a tendency to be transferred in the longitudinal direction of the piezoelectric elements shown in FIGS. 5A and 5B. Although not shown, there is transmission dependence of the waveform on the longitudinal direction of the piezoelectric elements, but weak transmission of the waveform also occurs in the direction intersecting the longitudinal direction or a radial direction. However, the present invention is intended to obtain an amplification effect in a specific frequency range in order to raise the sound pressure level of the speaker at a low frequency, and thus uses transmission dependence in the longitudinal direction to enhance the amplification effect.

While it is illustrated in the example shown in FIG. 2 that the third and fourth piezoelectric elements 200c and 200d have the same shape as the first and second piezoelectric elements 200a and 200b, embodiments are not limited thereto. If the first pair of piezoelectric elements and the second pair of piezoelectric elements have the same shape but are arranged at different spacing distances, the first pair of piezoelectric elements and the second pair of piezoelectric elements may exhibit substantially similar amplification effects. Therefore, the first pair and the second pair may be arranged to cross each other or have different shapes in the plane in order to complement and disperse the piezoelectric elements of the first and second pairs. Even in this case, the spacing distance between the piezoelectric elements of the first pair may be set to be different from that of the piezoelectric elements of the second pair to obtain the optimum amplification effects in different frequency ranges. In either case, arranging the first frequency range and the second frequency range, which are amplified by the first and second pairs of piezoelectric elements, adjacent to each other may ensure a uniform amplification effect in the low frequency range.

Hereinafter, the positional relationship of the piezoelectric elements will be described with reference to various cross-sectional views of the display device of the present invention.

Figure 6A:
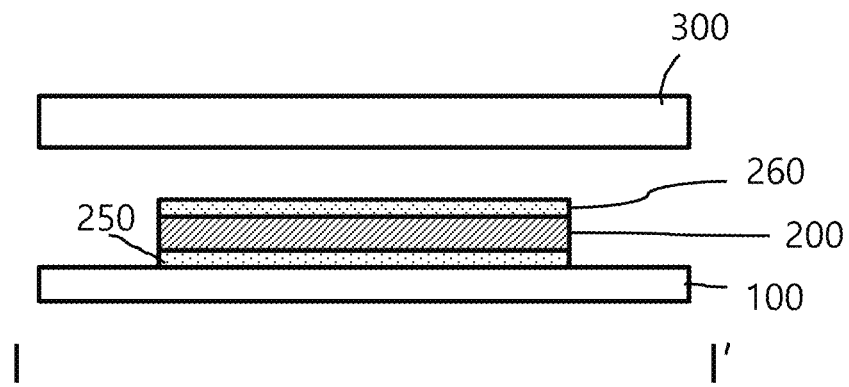
FIGS. 6A to 6D are cross-sectional views showing other modified examples taken along line I-I' of FIG. 2.
Figure 6B:
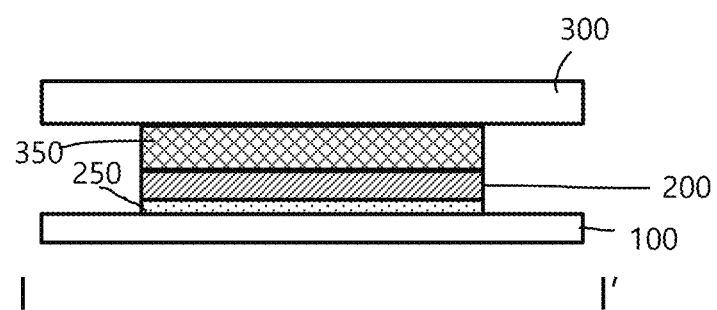
Figure 6C:
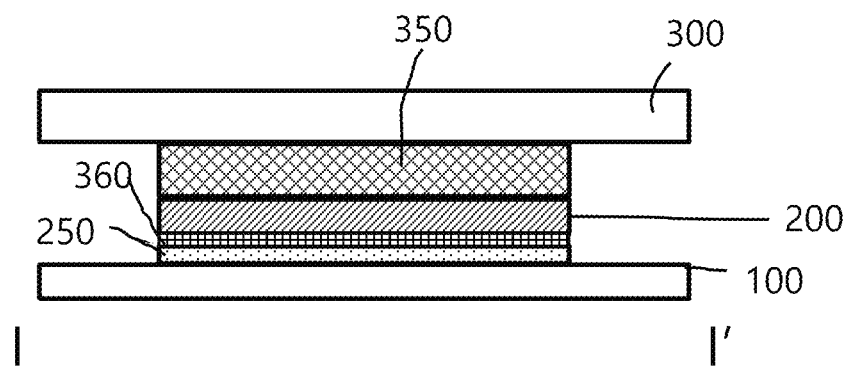
Figure 6D:
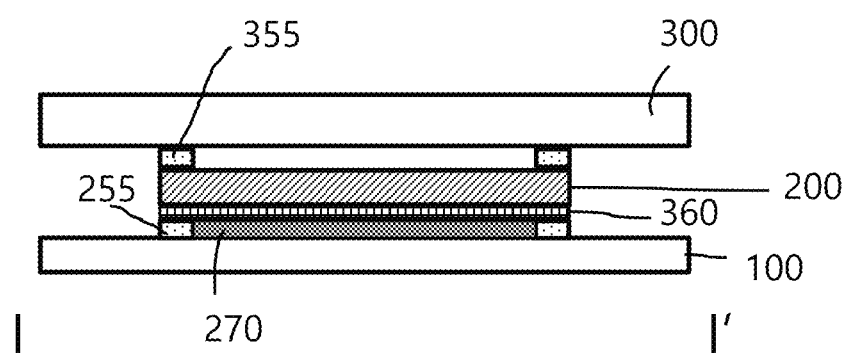
Figure 7A:
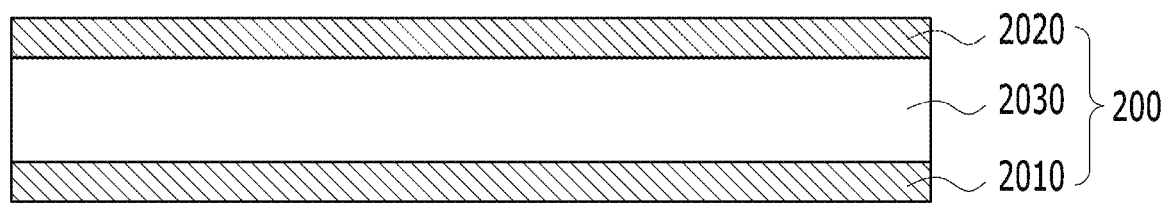
FIGS. 7A and 7B are cross-sectional views showing examples of piezoelectric elements used in the display device of the present disclosure.
Figure 7B:
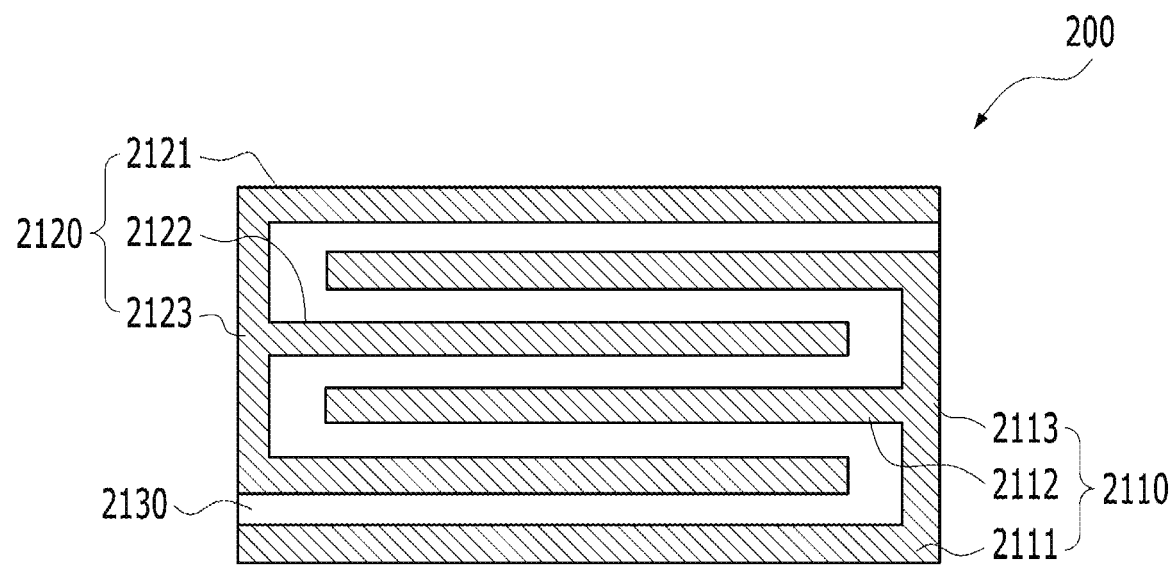

FIGS. 6A to 6D are cross-sectional views showing other modified examples taken along line I-I' of FIG. 2, and FIGS. 7A and 7B are cross-sectional views showing examples of piezoelectric elements used in the display device of the present disclosure.

FIGS. 6A to 6D are cross-sectional views of the display device, showing that the bottom cover 300 is positioned on the upper side by flipping over the display device. The display surface of the display panel 100 is positioned on the lower side. In the respective modified examples, a first surface of the piezoelectric element 200 makes surface contact with the rear surface of the display panel 100.

In the embodiments shown in FIGS. 6A to 6D, the piezoelectric element 200 includes a first surface and a second surface facing in opposite directions and a piezoelectric layer between the first and second surfaces. A detailed cross section thereof is shown in FIG. 7A or 7B.

That is, as shown in FIG. 7A, when the piezoelectric element 200 has a structure of a single stacked layer, the first surface and the second surface serve as a first electrode 2010 and a second electrode 2020 facing in opposite directions, respectively, and a piezoelectric layer 2030 is provided therebetween. Here, the first electrode 2010 and the second electrode 2020 may be connected to different FPCs through wires so as to receive a voltage signal of a corresponding polarity.

When the piezoelectric element 200 has a structure of a plurality of stacked layers as shown in FIG. 7B, a first electrode 2110 and a second electrode 2120 are alternately stacked with a piezoelectric layer 2130 placed therebetween.

The first electrode 2110 includes a first surface electrode 2111, a first internal electrode 2112 arranged between the first surface electrode 2111 and the piezoelectric layer 2130, and a first side connection electrode 2113 arranged on one side to connect the first surface electrode 2111 and the internal electrode 2112 in different layers. Similarly, the second electrode 2120 includes a second surface electrode 2121, a second internal electrode 2122 arranged between the second surface electrode 2121 and the piezoelectric layer 2130 and a second side connection electrode 2123 arranged to connect the second surface electrode 2121 and the second internal electrode 2122.

In the piezoelectric element 200, the first surface electrode 2111 and the first side connection electrode 2113 have a different polarity from the second surface electrode 2121 and the second side connection electrode 2123, and the component exposed to the outside may have a glass component in a metal component containing silver as a main component. Here, by including the glass component, stress produced due to difference in coefficient of thermal expansion between the exposed component and the piezoelectric layer 2030, 2130 may be reduced. Here, the first surface electrode 2111 or the first side connection electrode 2113 may be connected to the first FPC 161 through the first wire 171 shown in FIG. 2 to receive a voltage signal of a first polarity applied thereto, and the second surface electrode 2121 or the second side connection electrode 2123 may be connected to the second FPC 162 through the second wire 172 shown in FIG. 2 to receive a voltage signal of a second polarity applied thereto.

The first and second internal electrodes 2112 and 2122 may include silver (Ag) and palladium (Pd) as main components thereof, and further include a ceramic component constituting the piezoelectric layer 2130 to reduce stress produced due to difference in coefficient of thermal expansion between the piezoelectric layer 2130 and the first and second internal electrodes 2112 and 2122.

The piezoelectric layer 2030, 2130 converts an electrical signal applied through the electrodes into physical vibration to output sound. The piezoelectric layer 2030, 2130 is formed to be a single-layer thin film by performing a polishing process on film-type piezoelectric ceramics or is formed by depositing or coating a thin film of a stack structure. The material of the piezoelectric layer may include not only polycrystalline ceramics such as PZT ($PbZrO_3$—$PbTiO_3$) but also single crystal piezoelectric materials, such as PMN-PT ($Pb(Mg_{1/3}Nb_{2/3})O_3$—$PbTiO_3$), PZN-PT ($Pb(Zn_{1/3}Nb_{2/3})O_3$-$xPbTiO_3$), PIN-PT ($Pb(IN_{1/2}Nb_{1/2})O_3$—$PbTiO_3$), and PYN-PT ($Pb(Yb½Nb½)_1$-x $TixO_3$), flexible piezoelectric polymer materials, such as PVDF (polyvinylidene fluoride), P(VDF-TrFE) (copolymers of vinylidene fluoride and trifluoroethylene), and Pb-free piezoelectric materials, such as BNT ($BaNiTiO_3$) and BZT-BCT ($x[Ba(Zr_{0.2}Ti_{0.8})O_3]$-$(1-x)[(Ba_{0.7}Ca_{0.3})TiO_3]$).

Hereinafter, various embodiments of the piezoelectric element and the cross-sectional structure thereof that may be provided above and below the piezoelectric element in the display device of the present invention will be described.

As shown in FIG. 6A, a display device according to a first embodiment of the present invention includes a double-sided adhesive layer 250 interposed between and surface-attached to the rear surface of a display panel 100 and a first surface of a piezoelectric element 200. The display device may further include an insulator film 260 arranged on the side of a second surface of the piezoelectric element 200 so as to be spaced apart from the bottom cover 300. The insulator film 260 may be an inorganic film of an oxide film, a nitride film, or an oxynitride film, or an imide or amine-based thin organic film. The insulator film 260 serves to prevent contact between the metallic bottom cover 300 and the piezoelectric element 200 and to prevent influence on driving of the piezoelectric element 200 through electrical insulation between the bottom cover 300 and the piezoelectric element 200. Here, the first surface and the second surface of each piezoelectric element 200 are electrodes, and an electrical signal may be directly applied thereto through a wire.

The display device according to a second embodiment of the present invention shown in FIG. 6B further includes a damping member 350 disposed between the second surface of the piezoelectric element 200 and the bottom cover 300. The damping member 350 replaces the insulator film 260 described above.

Here, the damping member 350 is formed of a high-elasticity resin. The damping member 350 may be required to attenuate vibration transmitted to the bottom cover 300 because the vibration produced when an electrical signal is applied to the piezoelectric element 200 is transmitted to both the display panel 100, which corresponds to the front face of the piezoelectric element 200, and the bottom cover 300, which corresponds to the rear surface of the piezoelectric element 200, but only the front surface of the display panel 100 is needed when actually listening to sound. The damping member 350 is a kind of buffer member. If the gap between the bottom cover 300 and the piezoelectric element 200 is sufficient, the damping member 350 may be omitted. In addition, the damping member 350 may be arranged to contact the bottom cover 300 to ensure the attenuation operation on the contact surface. The damping member 350 may or may not contact the piezoelectric element 200.

The display device according to a third embodiment of the present invention shown in FIG. 6C further includes a metal plate 360 arranged between the double-sided layer 250 and the first surface of the piezoelectric element 200, in addition to the elements of the second embodiment. Here, the metal plate 360 may more effectively transmit the vibration generated in the piezoelectric element 200 to the display panel 100.

Compared to the structure of the first embodiment, the piezoelectric element 200 according to a fourth embodiment of the present invention shown in FIG. 6D further includes a metal plate 360 on the side of the first surface of the piezoelectric element 200, a first double-sided tape 255 provided only on the edge of an area between the metal plate 360 and the display panel 100 rather than throughout the layer of the area, and a buffer material 270 filling the empty interlayer space between the metal plate 360 and the display panel 100. Here, a second double-sided tape 355 having a shape similar to that of the first double-sided tape 255 may be further provided between the bottom cover 300 and the second surface of the piezoelectric element 200. Here, the second double-sided tape 355 may be optional.

In some cases, the second double-sided tape 355 between the bottom cover 300 and the second surface of the piezoelectric element 200 may be located at the center rather than the edge.

The damping member 350 or the metal plate 360 of the embodiments described above may be omitted if at least one pair of piezoelectric elements 200a and 200b or 200c and 200d provided on the rear surface side of the display panel 100 operates to have an effect of reinforcing amplification in the counterpart piezoelectric element and thus a sufficient sound pressure level is obtained in the low frequency range.

Hereinafter, the effect of the display device having the arrangement of the piezoelectric elements of FIG. 2 will be described through experimentation.

Figure 8:
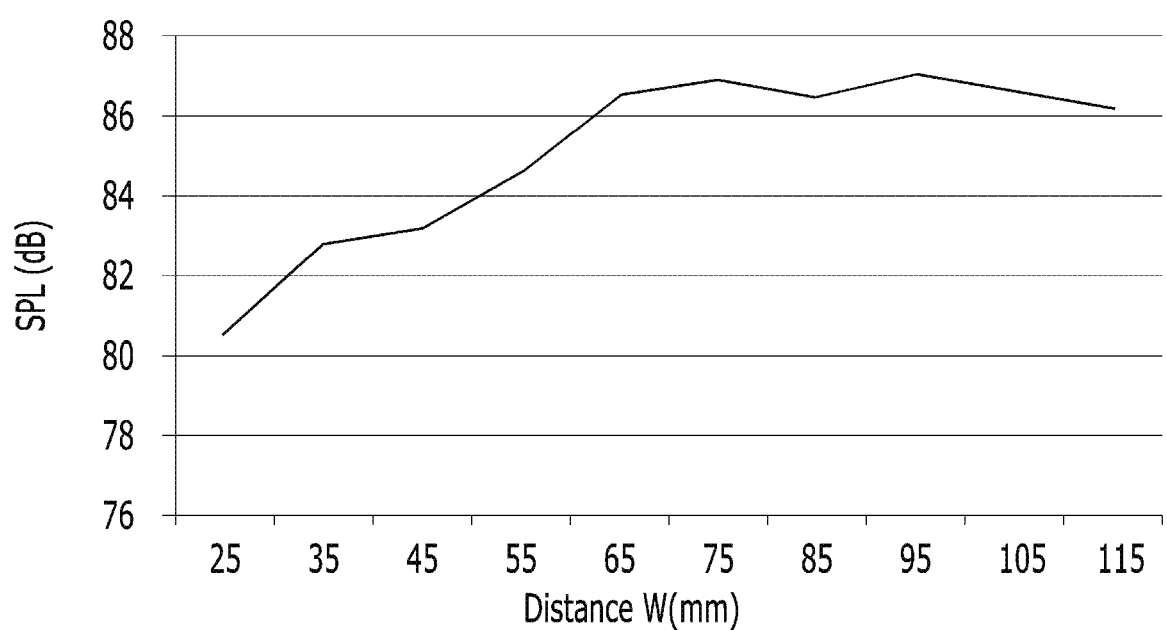
FIG. 8 is a graph depicting change in sound pressure level at 300 Hz according to the distance between the piezoelectric elements of the first pair in FIG. 2.
Figure 9:
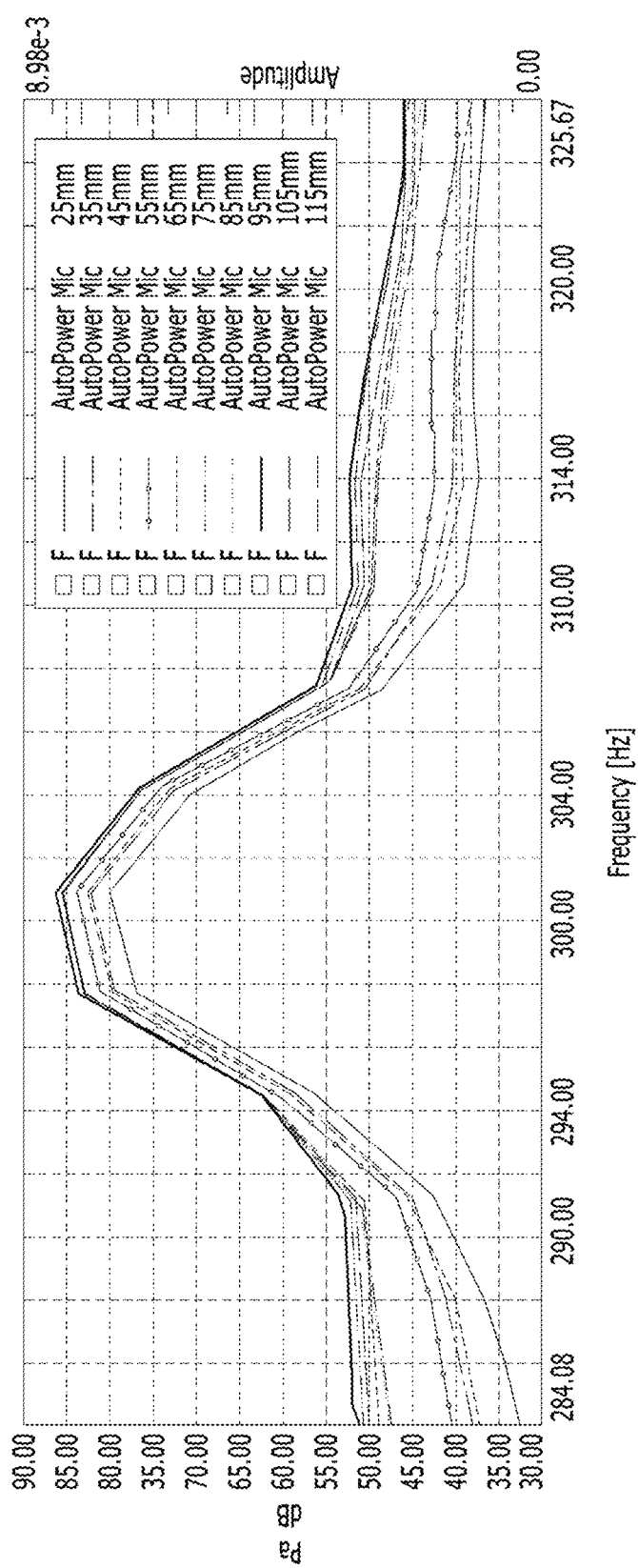
FIG. 9 is a graph depicting the sound pressure levels in a low frequency range according to the distance between the piezoelectric elements of the first pair in FIG. 2.

FIG. 8 is a graph depicting a change in the sound pressure level at 300 Hz according to the distance between the piezoelectric elements of the first pair in FIG. 2, and FIG. 9 is a graph depicting the sound pressure levels in a low frequency range according to the distance between the piezoelectric elements of the first pair in FIG. 2.

The sound pressure level was measured at around 300 Hz while changing the spacing distance a between the first and second piezoelectric elements 200a and 200b of FIG. 2 horizontally arranged in parallel. It was found that a sound pressure of 86 dB may be obtained when the first and second piezoelectric elements 200a and 200b are spaced apart from each other by 63 mm to 115 mm, as shown in FIG. 8. This sound pressure level was measured at 300 Hz at which the highest rise occurred. As shown in FIG. 9, it can be seen that, when the first and second piezoelectric elements 200a and 200b are spaced apart from each other by 65 mm to 115 mm in a range of (300±16) Hz, the difference in sound pressure level from the maximum sound pressure level of 86 dB at the low frequencies obtained by the amplification effect of the first and second piezoelectric elements 200a and 200b is within about 35 dB. That is, when the first pair of piezoelectric elements 200a and 200b is arranged spaced apart from each other by the first distance of FIG. 2, the sound pressure level is continuously improved in at least a frequency range having a span of 32 Hz at around 300 Hz. Therefore, as the amplification effect in the low frequency range is obtained by the arrangement of at least one pair of piezoelectric elements spaced by a specific distance, the display device of the present invention may prevent the sound pressure from dropping to such an extent that it is impossible to hear the sound in the low frequency range. The sound pressure may be raised by the arrangement of the first and second piezoelectric elements 200a and 200b in at least the range of 292 Hz to 314 Hz which continuously expands by 20 Hz or more in the low frequency range of 130 Hz to 350 Hz.

Figure 10:
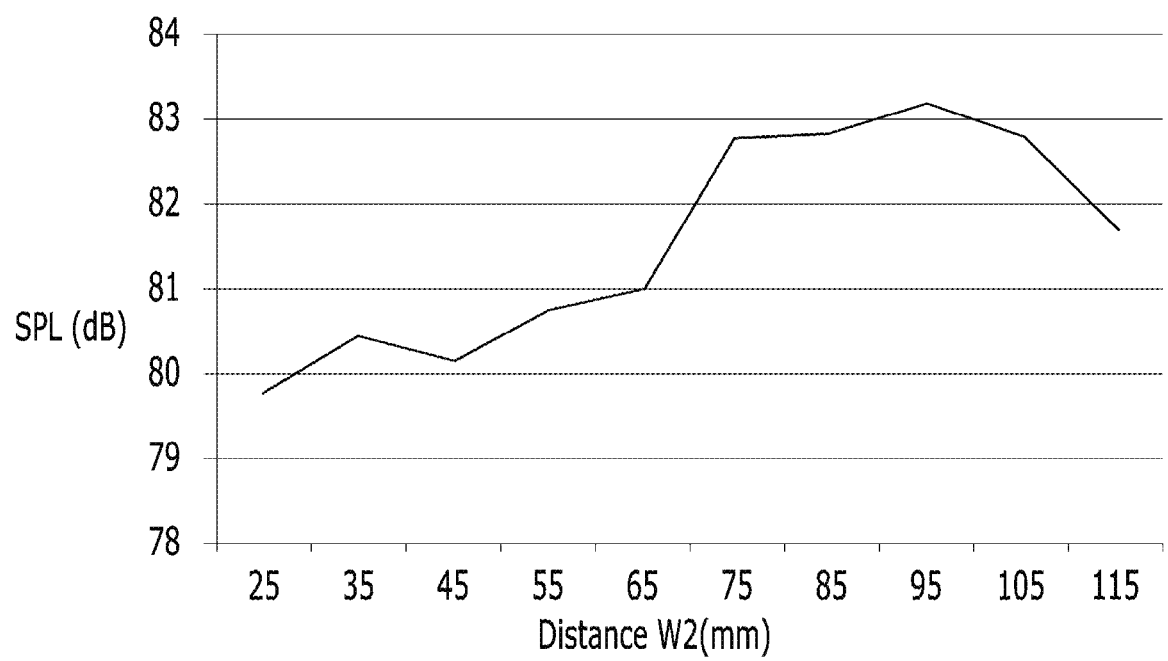
FIG. 10 is a graph depicting change in sound pressure level at 300 Hz according to the distance between the piezoelectric elements of the second pair in FIG. 2.
Figure 11:
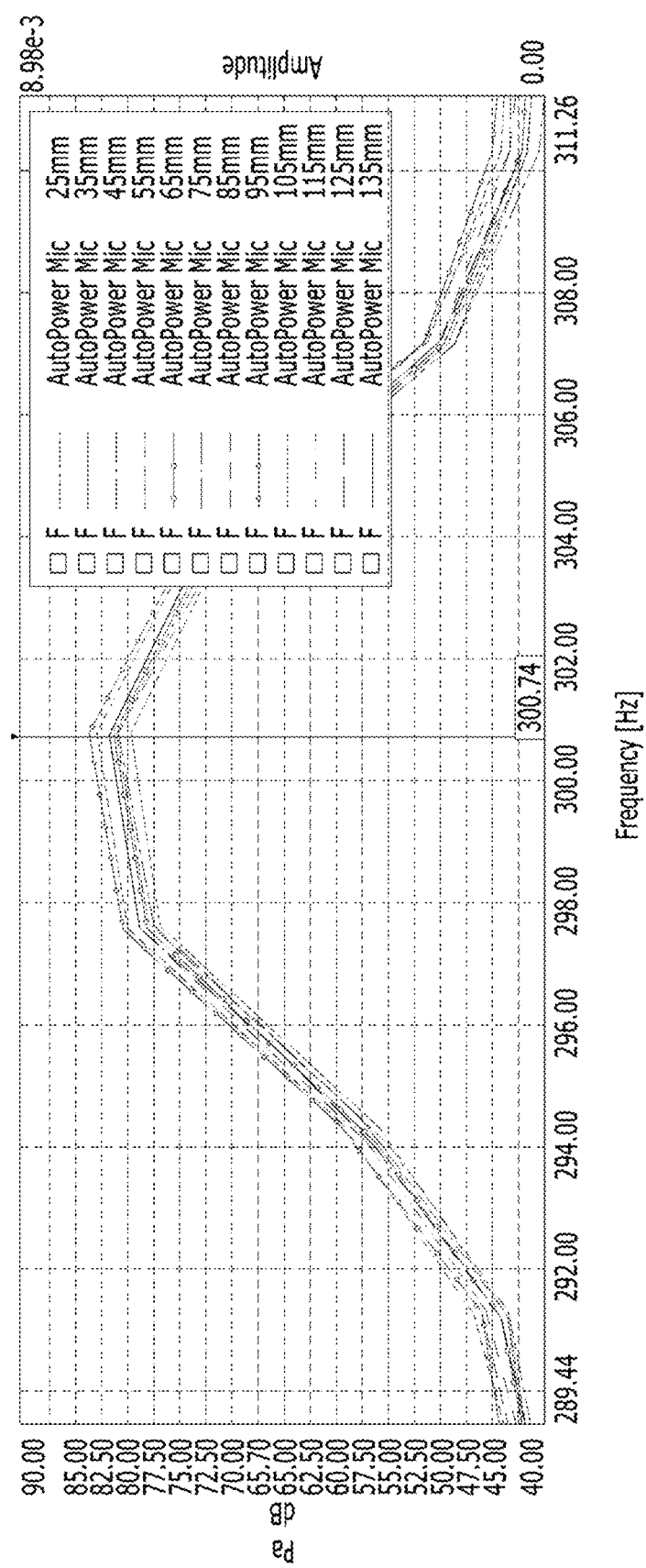
FIG. 11 is a graph depicting the sound pressure levels in a low frequency range according to the distance between the piezoelectric elements of the second pair in FIG. 2.

FIG. 10 is a graph depicting a change in the sound pressure level at 300 Hz according to the distance between the piezoelectric elements of the second pair in FIG. 2, and FIG. 11 is a graph depicting the sound pressure levels in a low frequency range according to the distance between the piezoelectric elements of the second pair in FIG. 2.

As shown in FIG. 10, the third and fourth piezoelectric elements 200c and 200d each having a transversely long axis are arranged so as to have a vertical spacing distance b therebetween, and a sound pressure level is measured at around 300 Hz while changing the spacing distance d. It can be seen that a sound pressure close to 83 dB may be obtained when the spacing distance is 75 mm to 105 mm. The third and fourth piezoelectric elements 200c and 200d exhibit the highest sound pressure level at 300.74 Hz. That is, as shown in FIG. 11, the sound pressure level is measured by changing the vertical spacing distance between the third and fourth piezoelectric elements 200c and 200d from 25 mm to 135 mm. It can be seen that the third piezoelectric element 200c and the fourth piezoelectric element 200d produce a difference between the highest sound pressure and the lowest sound pressure at the spacing distance b of 25 mm to 135 mm in the range of (300.74±6) Hz. This means that a sound pressure level compensating effect with a strong dependence on a specific distance is obtained when a pair of piezoelectric elements is arranged so as to have a longitudinal spacing distance as in the arrangement of the first and second piezoelectric elements 200a and 200b described with reference to FIGS. 8 and 9.

However, even in the case wherein the piezoelectric elements are arranged to have a spacing distance in the intersecting direction like the piezoelectric elements 200c and 200d, rise to the highest sound pressure is observed when the specific spacing distance is given as shown in FIG. 10. Therefore, it can be seen that the specific spacing distance is meaningful even for a pair of piezoelectric elements 200c and 200d spaced apart from each other in the direction crossing the longitudinal direction of the piezoelectric elements.

In order to make the sound pressure level compensation effect of the pair of piezoelectric elements more effective, a planar arrangement different from the arrangement shown in FIG. 2 may be employed.

FIGS. 12A to 12E are plan views illustrating arrangement of piezoelectric elements according to various embodiments of the display device of the present disclosure.

Figure 12A:
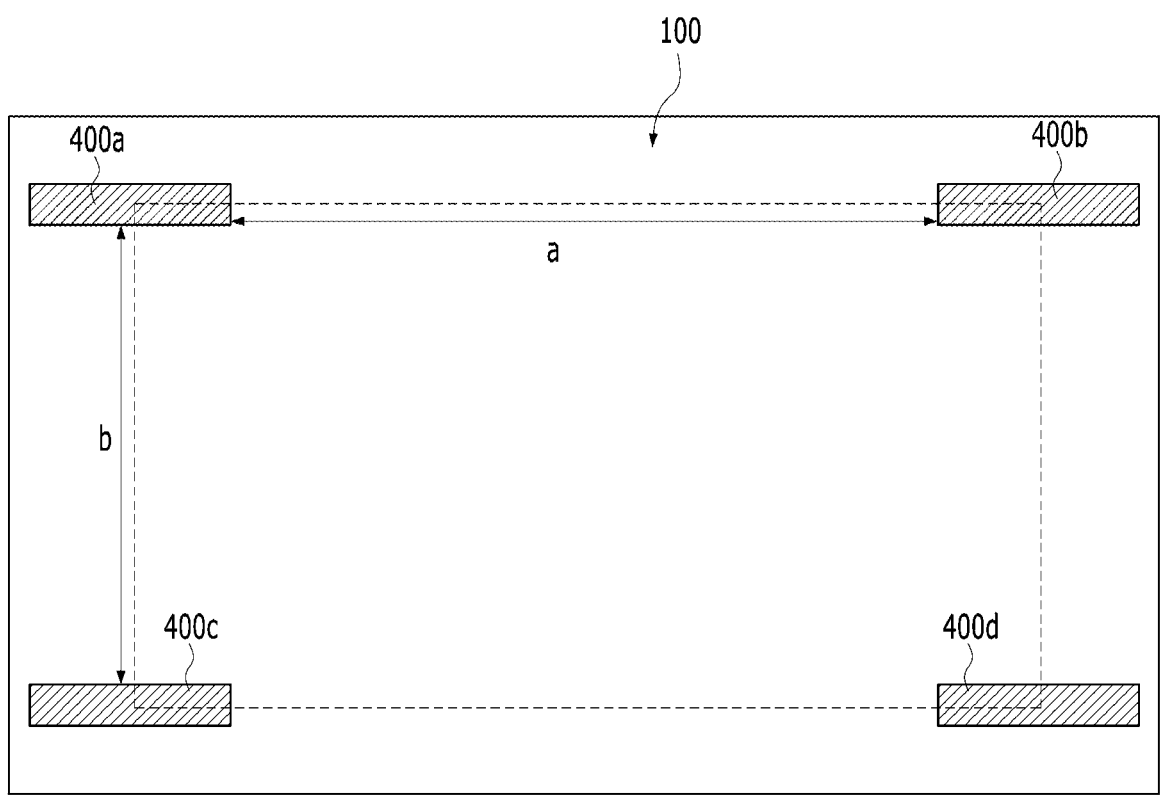
FIGS. 12A to 12E are plan views illustrating arrangement of piezoelectric elements according to various embodiments of the display device of the present disclosure.

A display device according to a fifth embodiment corresponding to FIG. 12A includes first to fourth piezoelectric elements 400a, 400b, 400c, and 400d arranged at the corners of an imaginary rectangle on the rear surface of the display panel 100.

In this case, without increasing the number of piezoelectric elements from the number of piezoelectric elements of the display device of FIG. 1, a first pair of piezoelectric elements 400a and 400b spaced apart from each other by a first distance a, a second pair of piezoelectric elements 400c and 400d spaced apart from each other by the first distance a, a third pair of piezoelectric elements 400a and 400c spaced apart from each other by a second distance b crossing the first distance a, and a fourth pair of piezoelectric elements 400b and 400d spaced apart from each other by the second distance b are defined, and the piezoelectric elements of each pair may reinforce the sound pressure level of a specific frequency, thereby enhancing the sound pressure level in a low frequency range.

Here, the first and second pairs of piezoelectric elements 400a, 400b/400c, 400d spaced apart from each other by a distance a and the third and fourth pairs of piezoelectric elements 400a, 400d/400b, 400c spaced apart from each other by a distance b different from the distance a cause amplification in different frequency ranges. Thus, when the frequency ranges in which amplification occurs are adjacent to each other, the audible range of low frequencies may be widened and sound pressure may be set even in the audible range.

Figure 12B:
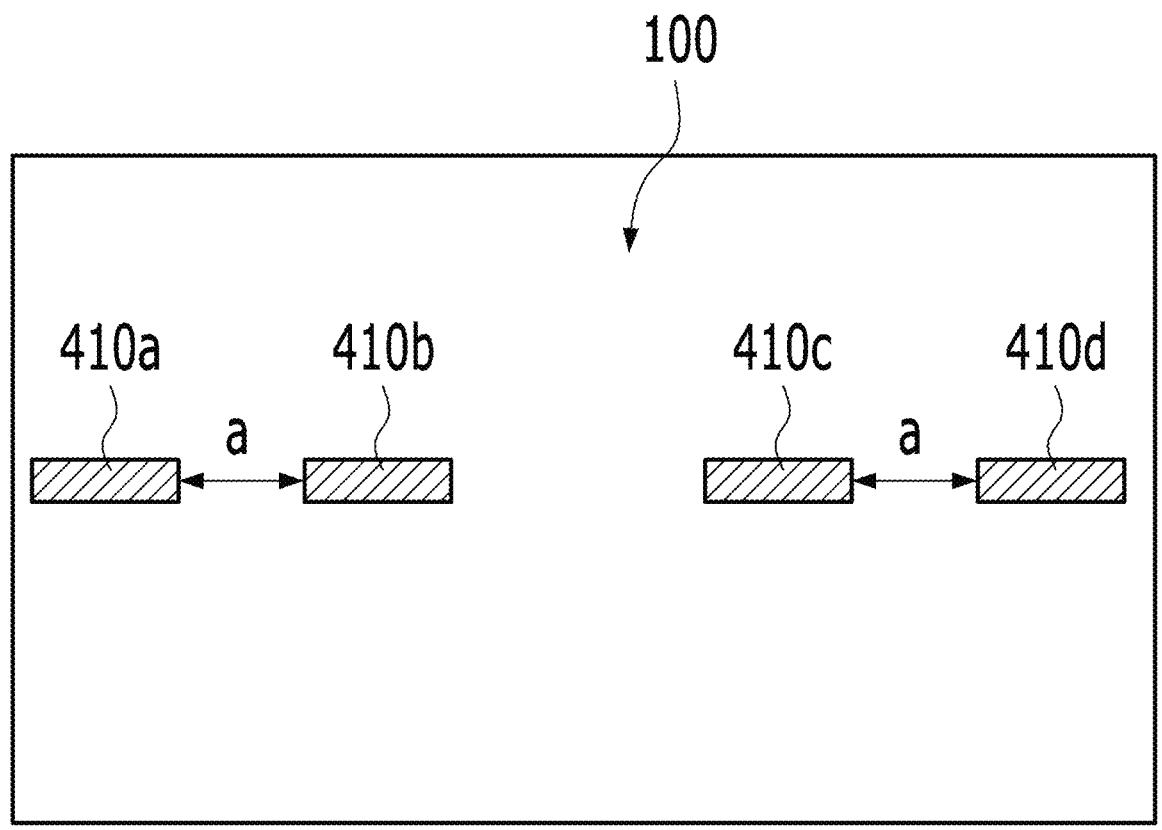

The display device according to a sixth embodiment corresponding to FIG. 12B includes first to fourth piezoelectric elements 410a, 410b, 410c and 410d arranged in series in the longitudinal direction on the rear surface of the display panel 100. Here, the first pair of piezoelectric elements 410a and 410b and the second pair of piezoelectric elements 410c and 410d are arranged on both sides of the rear surface of the display panel 100 and the piezoelectric elements of each pair are spaced apart from each other by the same distance. Here, the two pairs of piezoelectric elements 410a, 410b/410c, 410d are symmetrically arranged on the rear surface of the display panel 100 in order to obtain a bass amplification effect in stereo in the display device. This arrangement may be used mainly for a display device having a large area. As described above, amplification is effective when the spacing distance between the piezoelectric elements of each pair parallel to each other is about 63 mm to 115 mm. If the distance between the piezoelectric elements parallel to each other exceeds 115 mm, the vibration transmission effect from a piezoelectric element causing vibration and the amplification effect are deteriorated as the distance from the piezoelectric element causing vibration increases. Accordingly, the pairs of piezoelectric elements arranged on the rear surface of the display panel 100 may be disposed in different regions even if they have the same arrangement, in consideration of transmission of vibration from the piezoelectric elements.

Figure 12C:
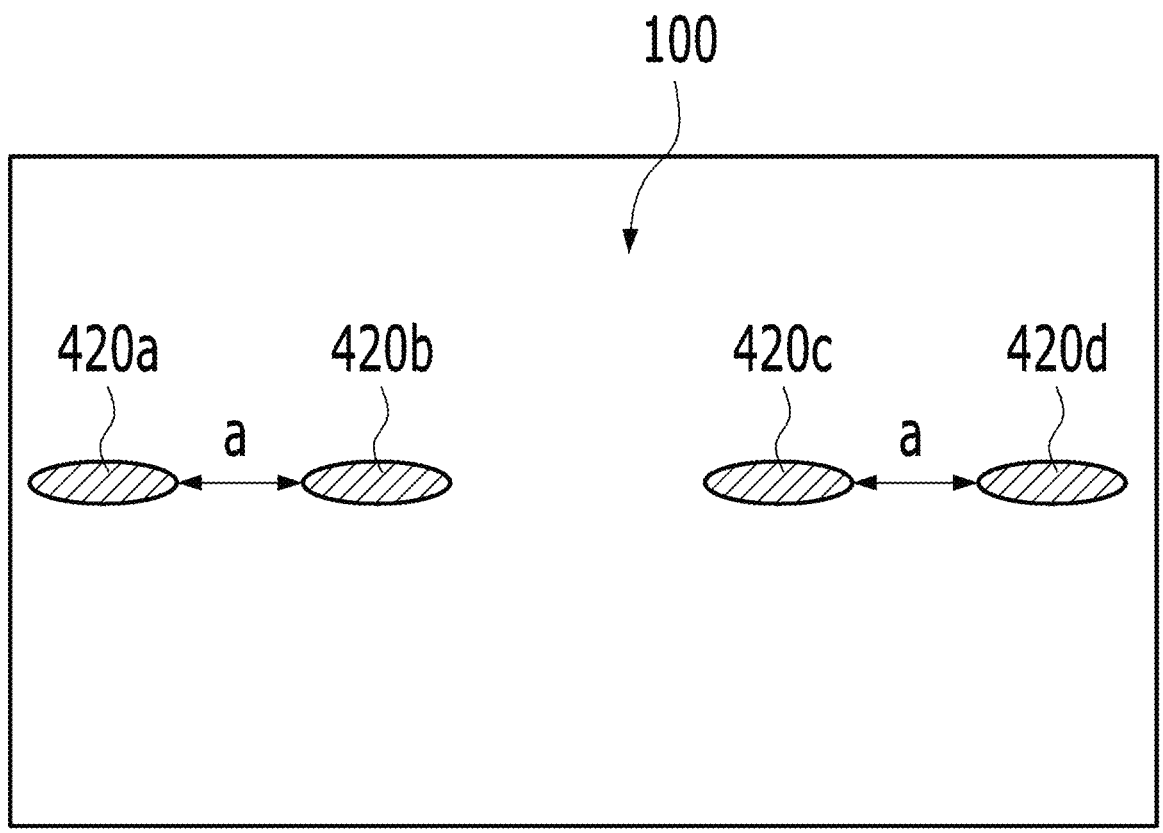

As shown in FIG. 12C, the display device according to a seventh embodiment of the present invention is distinguished from the sixth embodiment in that the planar shape of each of the first to fourth piezoelectric elements 420a to 420d is elliptical. The resulting effect is similar to that of the sixth embodiment described above. In some cases, the planar shape of the piezoelectric elements may be close to a circle.

Figure 12D:
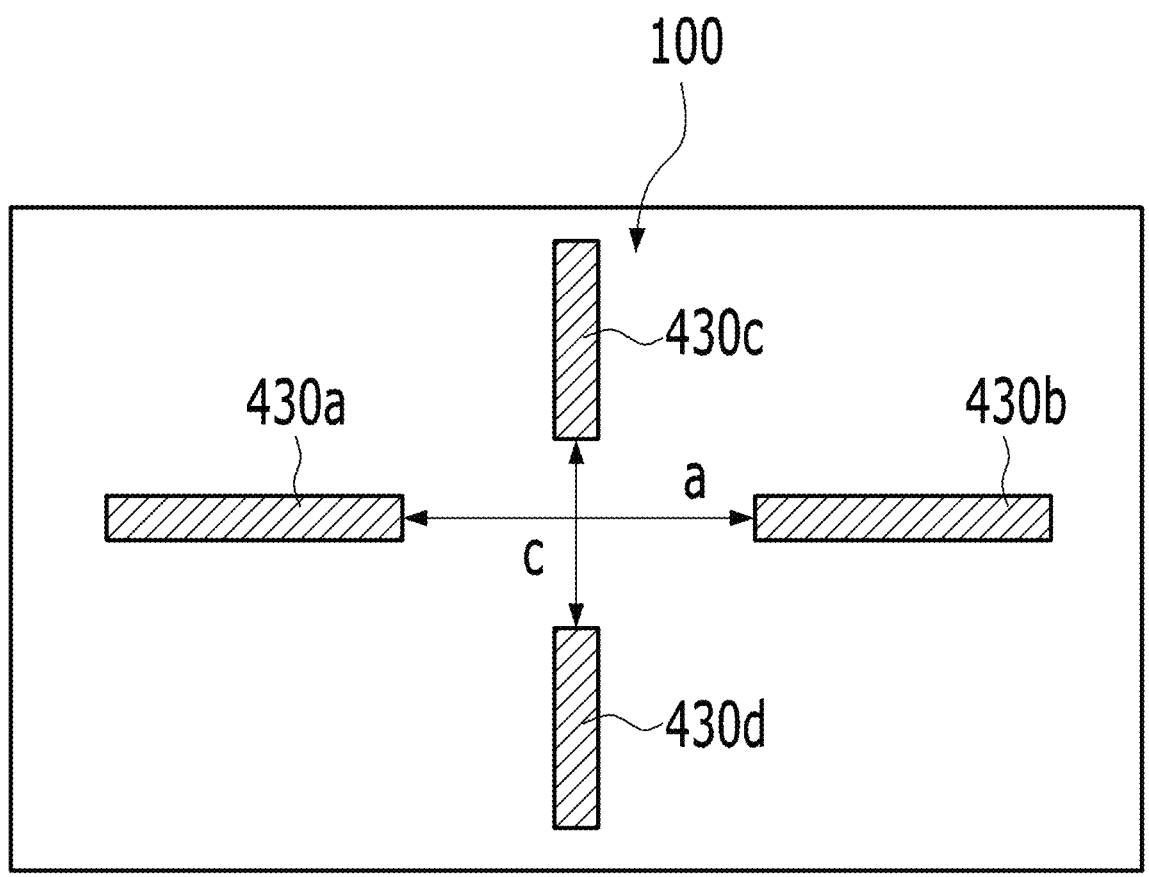

As shown in FIG. 12D, the display device according to an eighth embodiment of the present invention is distinguished from FIG. 1 in that the piezoelectric elements 430a and 430b of the first pair and the piezoelectric elements 430c and 430d of the second pair are respectively spaced apart from each other in the longitudinal direction of the piezoelectric elements. The piezoelectric elements 430a and 430b of the first pair are spaced apart by a first distance a and the piezoelectric elements 430c and 430d of the second pair are spaced apart by a second distance c. Here, the first and second distances a and c may differ from each other to select different frequency ranges in which amplification is to be performed.

Figure 12E:
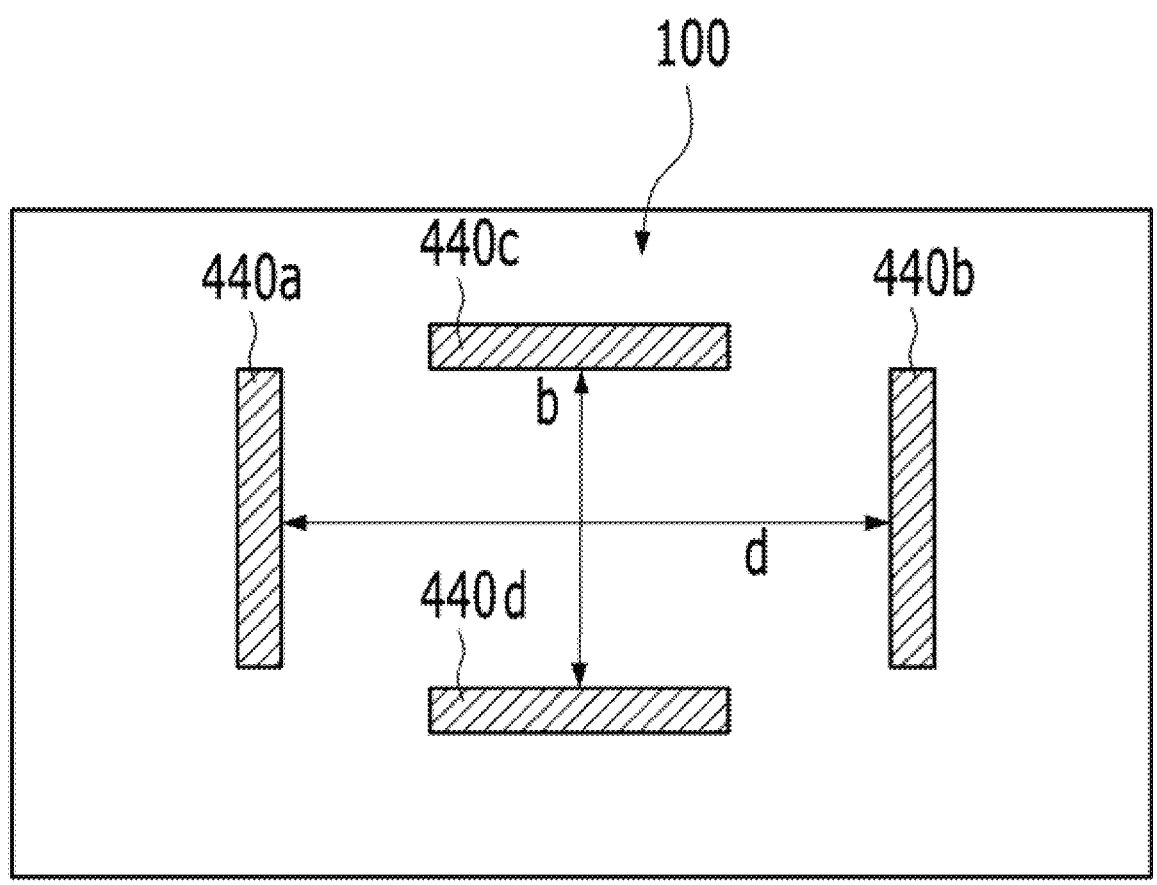

As shown in FIG. 12E, the display device according to a ninth embodiment of the present invention is distinguished from the eighth embodiment described above in that the longitudinal direction of each of the first to fourth piezoelectric elements 440a, 440b, 440c, 440d is taken in the opposite direction, while the piezoelectric elements 440a and 440b of the first pair are spaced apart by a first distance d and the piezoelectric elements 440c and 440d of the second pair are spaced apart by a second distance b. Here, by setting different spacing distances, the amplification effect may be obtained in different frequency ranges, obtaining uniform improvement in the frequency sound pressure level in the low frequency range.

The display devices according to the fifth to ninth embodiments described above may have a single pair of piezoelectric elements or have a plurality pair of piezoelectric elements applied at different positions to reinforce different frequency ranges. It is also possible to use a combination of the piezoelectric elements to arrange pairs of piezoelectric elements.

Figure 13:
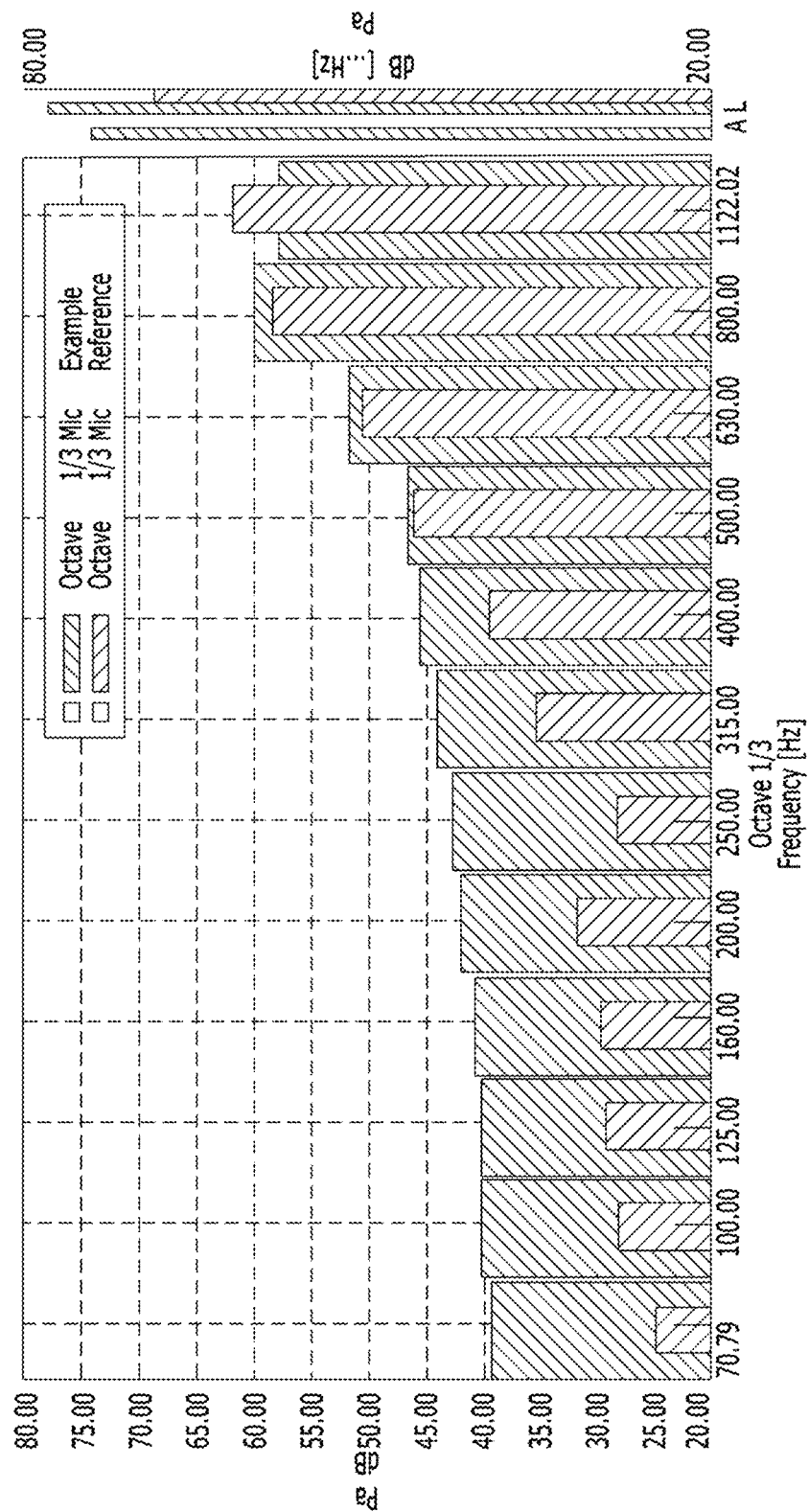
FIG. 13 is a graph depicting the sound pressure levels for each wavelength according to a Reference and the embodiment of FIG. 12B.

FIG. 13 is a graph depicting the sound pressure levels for each wavelength according to a Reference and the embodiment of FIG. 12B.

The Reference represents a speaker implemented with a single piezoelectric element. The Example of embodiment represents arrangement of a first pair of piezoelectric elements 410 and 410b and a second pair of piezoelectric elements 410c and 410d as shown in FIG. 12B.

The sound pressures of the Reference and the Example of embodiment are discussed below with reference to FIG. 13. It can be seen that, even if the respective pairs of piezoelectric elements disposed on both sides have the same spacing distance and have the same amplification effect, the Example of embodiment obtains a uniform rise of sound pressure levels in a low frequency range of 70.79 Hz to 400 Hz, compared to the Reference. Particularly, it can be seen that a high rise of the sound pressure level appears at frequencies around 250 Hz and the amplification effect is maximized at these frequencies.

In the range above 500 Hz, the sound pressure becomes greater than or equal to 45 dB in both the Reference and the Example of embodiment, and thus it can be seen that this frequency range is an audible range. In the Example of embodiment of FIG. 13, the voltage applied to the piezoelectric elements is reduced to a value less than a reference value such that the average sound pressure becomes as low as about 70 dB in the entire frequency range. Thus, a sound pressure level lower than or equal to 45 dB is observed in the low frequency range according to a pair of piezoelectric elements arranged parallel to each other. However, if the voltage applied to the piezoelectric element is increased to be higher than or equal to the reference value, a sound pressure level rise to 80 dB or more may be obtained even in the low frequency range when a pair of piezoelectric elements arranged in parallel is provided. FIG. suggests that the embodiment of FIG. 12B achieves an improvement in sound pressure level by 10 dB to 15 dB or more compared to a case of use of a single piezoelectric element in the low frequency range due to the difference in sound pressure level between the single piezoelectric element and a pair of piezoelectric elements arranged in parallel and spaced apart by a specific distance.

Figure 14:
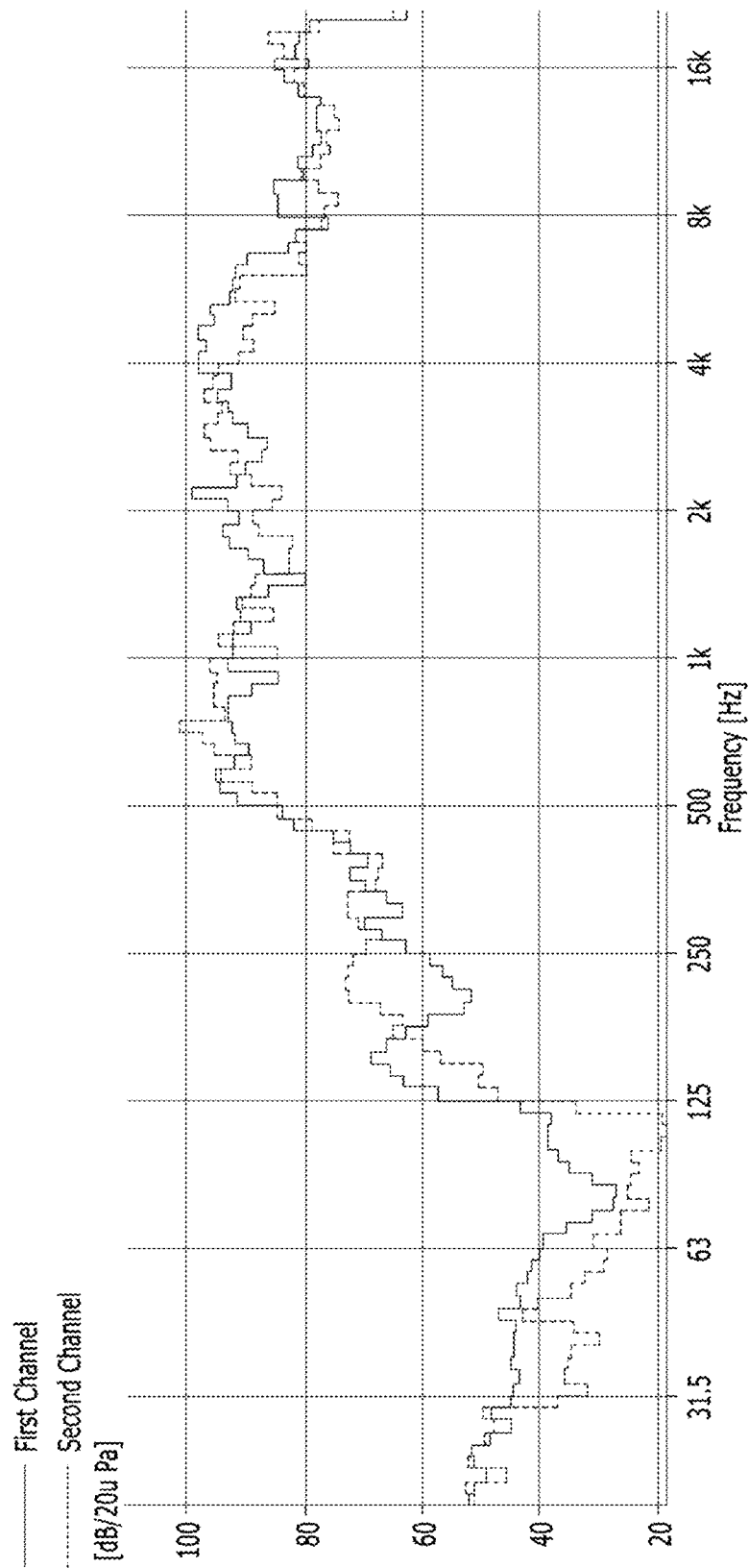
FIG. 14 is a graph depicting the sound pressure levels for each frequency obtained when the embodiment of FIG. 12E is applied.

FIG. 14 is a graph depicting the sound pressure levels for each frequency obtained when the embodiment of FIG. 12E is applied.

As in the embodiment of FIG. 12E, when the first and second piezoelectric elements 440a and 440b having a longitudinal direction in the vertical direction are arranged so as to have a first spacing distance from each other in the horizontal direction, and the third and fourth piezoelectric elements 440c and 440d having a longitudinal direction in the horizontal direction are arranged so as to have a second spacing distance from each other in the vertical direction, rise of the sound pressure level is observed in different frequency ranges due to the amplification effect of each pair of piezoelectric elements as shown in FIG. 14. That is, there is a primary sound pressure rise at least in the range of 125 Hz to 175 Hz, and a secondary sound pressure rise is observed in the range of 175 Hz to 350 Hz.

Referring to FIG. 14, the sound actually heard on the side to the display panel 100 is determined by the peak values of the two graphs at each frequency. The low point of intersection of the two graphs shown between the peak in the range of 125 Hz to 175 Hz and the peak in the range of 175 Hz to 350 Hz has a difference in sound pressure level of 10 dB or less from the peak point. This means that this structure may at least secure a sound pressure of 60 dB or more in a range above 125 Hz and that a user located on the opposite side of the piezoelectric elements can hear sound with a uniform sound quality because there is no significant deviation in sound pressure even in the low frequency range.

As is apparent from the above description, the display device of the present invention has the following effects.

When a speaker is implemented with piezoelectric elements on the rear surface of a display panel, a pair of piezoelectric elements which are parallel to each other are separated from each other by a specific distance such that the vibration waveforms of the respective piezoelectric elements are amplified. Accordingly, the audio frequency range of the speaker using the piezoelectric elements may be widened by amplifying the sound pressure level in the low frequency range.

Further, a plurality of pairs of piezoelectric elements may be provided and a different distance between the piezoelectric elements may be set for each of the pairs to amplify the sound pressure level in different frequency ranges. Therefore, the sound pressure level may be evenly raised in a certain range rather than at a specific low frequency.

It will be apparent to those skilled in the art that various modifications and variations can be made in the display device of the present disclosure without departing from the spirit and scope of the inventions. Thus, it is intended that the present disclosure cover the modifications and variations of this disclosure provided they come within the scope of the appended claims and their equivalents.

What is claimed is:

1. A display device, comprising:
   a display panel;
   a bottom cover having a bottom surface spaced a predetermined distance from a rear surface of the display panel, the bottom cover being configured to accommodate the display panel;
   a first pair of piezoelectric elements attached to the rear surface of the display panel, the first pair of piezoelectric elements comprising a first piezoelectric element and a second piezoelectric element respectively arranged in a first direction along a longitudinal axis of the display panel and spaced apart from each other by a first distance in the first direction; and
   a second pair of piezoelectric elements, the second pair of piezoelectric elements comprising a third piezoelectric element and a fourth piezoelectric element spaced apart from each other by a second distance arranged in a second direction intersecting the first direction,
   wherein each of the first and second piezoelectric elements has a rectangular or elliptical shape longitudinal in the first direction,
   wherein each of the third and the fourth piezoelectric elements has a rectangular or elliptical shape longitudinal in the direction along the first direction,
   wherein each of the first to fourth piezoelectric elements is configured to reproduce a sound,
   wherein the first and second piezoelectric elements together amplify a pressure of the sound in a first frequency range from 130 Hz to 350 Hz, and
   wherein the third and fourth piezoelectric elements together amplify a pressure of the sound in a second frequency range different from the first frequency range.

2. The display device according to claim 1, wherein the first distance is 9 to 15 times a thickness of the display panel.

3. The display device according to claim 1, wherein the first distance is 63 mm to 115 mm.

4. The display device according to claim 3, wherein the first frequency range has a continuous span of at least 20 Hz between 130 Hz and 350 Hz.

5. The display device according to claim 1, wherein at least one of the first and second pairs of piezoelectric elements comprises a plurality of piezoelectric elements arranged at different positions.

6. The display device according to claim 1, wherein the first frequency range and the second frequency range are adjacent to each other.

7. The display device according to claim 1, wherein the second distance is 75 mm to 105 mm.

8. The display device according to claim 1, wherein the display panel has two or more peak points of sound pressure within the first frequency range and the second frequency range.

9. The display device according to claim 1, wherein:
   each of the first to fourth piezoelectric elements comprises a first surface, a second surface, and a piezoelectric layer arranged between the first surface and the second surface, the first surface and the second surface having a shape of a flat plate, facing in opposite directions and having different polarities; and
   the first surface is attached to the rear surface of the display panel.

10. The display device according to claim 9, further comprising a first double-sided tape surface-attached to the first surface and the rear surface of the display panel.

11. The display device according to claim 10, further comprising a metal plate arranged between the first surface and the first double-sided tape.

12. The display device according to claim 9, further comprising a buffer member arranged between the second surface and the bottom surface of the bottom cover.

13. The display device according to claim 1, wherein a difference in peak-to-peak sound pressure level between a peak point of the first frequency range and a peak point of the second frequency range is less than or equal to 10 dB, the first frequency range and the second frequency range being adjacent to each other.

14. The display device according to claim 1, wherein the first to the fourth piezoelectric elements are connected to a first FPC (flexible printed circuit) and a second FPC arranged on the rear surface of the display panel, respectively.

15. The display device according to claim 1, wherein the first and second piezoelectric elements are in a first line, and the third and fourth piezoelectric elements are on a second line and a third line, respectively, different from the first line.

16. A display device, comprising:
- a display panel;
- a bottom cover having a bottom surface spaced a predetermined distance from a rear surface of the display panel, the bottom cover being configured to accommodate the display panel;
- a first pair of piezoelectric elements attached to the rear surface of the display panel, the first pair of piezoelectric elements comprising a first piezoelectric element and a second piezoelectric element respectively arranged in a first direction along a longitudinal axis of the display panel and spaced apart from each other by a first distance in the first direction to reproduce a sound and to reinforce at least a first frequency range of the sound from 130 Hz to 350 Hz, wherein the first and second piezoelectric elements each have a rectangular or elliptical shape longitudinal in the first direction along the first distance between the first and second piezoelectric elements; and a second pair of piezoelectric elements arranged in series with the first pair of piezoelectric elements on the rear surface of the display panel, the second pair of piezoelectric elements comprising a third piezoelectric element and a fourth piezoelectric element respectively arranged in the first direction and spaced apart from each other by the first distance, and wherein the first to the fourth piezoelectric elements are on the same horizontal line.

* * * * *